April 21, 1970 R. N. MULLIN 3,507,438
DOWEL INSTALLING MACHINE
Filed Sept. 15, 1967 9 Sheets-Sheet 1

FIG. 1.

INVENTOR.
ROBERT N. MULLIN
BY
FOWLER, KNOBBE
& MARTENS
ATTORNEYS.

INVENTOR.
ROBERT N. MULLIN
BY
FOWLER, KNOBBE
& MARTENS
ATTORNEYS.

INVENTOR.
ROBERT N. MULLIN

BY FOWLER, KNOBBE & MARTENS
ATTORNEYS.

April 21, 1970 R. N. MULLIN 3,507,438
DOWEL INSTALLING MACHINE
Filed Sept. 15. 1967 9 Sheets-Sheet 7

INVENTOR.
ROBERT N. MULLIN
BY
FOWLER, KNOBBE
& MARTENS
ATTORNEYS.

Fig. 14.

United States Patent Office 3,507,438
Patented Apr. 21, 1970

3,507,438
DOWEL INSTALLING MACHINE
Robert N. Mullin, Fullerton, Calif., assignor to Johnny Bean Machinery Co., Fullerton, Calif.
Filed Sept. 15, 1967, Ser. No. 668,077
Int. Cl. B25c 1/04
U.S. Cl. 227—14          21 Claims

ABSTRACT OF THE DISCLOSURE

A vertical stack of workpieces having a row of sockets on opposite ends are supported between a pair of dowel driving assemblies which are traversed and indexed along the row of sockets in the bottom workpiece to drive dowels simultaneously into the sockets on opposite ends of the workpiece. A glue dispensing nozzle automatically injects glue into the sockets in the second to the bottom board while the dowels are being driven into the sockets of the bottom board. The bottom workpiece is then automatically ejected and the dowel driving cycle started for the next board. Horizontal and vertical adjustment of the angular orientation of the dowel driving assemblies enables the machine to handle obliquely oriented sockets.

BACKGROUND OF THE INVENTION

This invention relates to an improved machine and method for automatically installing and gluing dowels.

High volume manufacture of furniture and similar items involving dowel installing operations for joining adjacent members requires a considerable amount of time and, hence, expense if many of the functions are performed by hand. Hence, considerable effort has been expended in the development of machines for automatically installing dowels. These attempts have been only partially successfully, however, in that certain doweling operations could not be conveniently performed by the available machines.

For example, in many furniture designs supporting struts or cross-pieces often have end surfaces which are obliquely angled with respect to the main surface of the member, and since dowels are preferably installed perpendicularly with respect to such end surfaces, the dowel receiving socket is also obliquely oriented. Accordingly, it is desirable that a doweling machine be sufficiently versatile to handle parts with such angled dowel receiving sockets as well as the simpler arrangements wherein the end of the workpiece is perpendicular to its primary length. It is also desirable that the doweling machine be able to handle curved struts and board as well as straight members.

Workpieces having obliquely oriented end surfaces or having curved shapes introduce additional problems such as providing adequate clearance to permit automatic ejection of a doweled member. Also, the angled end surfaces introduce complexities regarding the proper positioning of a workpiece with respect to a reference surface that accurately locates the sockets in the workpiece.

It is necessary that dowels be glued in position and, hence, an acceptable automatic doweling machine must have adequate gluing means which is both reliable and fast operating. Also, dowels must be automatically supplied to the dowel driving assemblies in a simple and reliable manner.

SUMMARY OF THE INVENTION

In the improved doweling machine of the invention, a hopper confines a vertical stack of workpieces each having an edge surface with one or more dowel receiving sockets drilled therein with the sockets of each workpiece in the stack being vertically aligned. A dowel driving assembly is preferably mounted adjacent each end of the bottom portion of the hopper containing the workpieces, with the assemblies being located at the proper height to drive a dowel into a socket in the edge of the bottom workpiece. At the completion of the dowel driving operation, an ejector assembly is automatically energized to eject the bottom workpiece from the hopper, thus allowing the stack to fall so that the succeeding workpiece is in position for the next dowel driving operation. With dowel driving assemblies located on each edge of the hopper, dowels may be simultaneously driven into opposite ends of the workpiece.

In a preferred embodiment of the invention, the dowel driving assemblies are mounted to be traversed along the edge of the bottom workpiece and means are provided for indexing the dowel driving assembly to momentarily stop the assembly and drive a dowel when aligned with each of the sockets in the edge of the workpiece. At the completion of the traversing movement, the ejector mechanism is actuated, and at the completion of an ejection operation, the traversing movement for the next workpiece is automatically initiated.

To accommodate workpieces having obliquely oriented sockets in their edge surfaces, the dowel driving assemblies are mounted to be pivoted about a vertical axis and about a horizontal axis, and then fixed in the desired orientation perpendicular to the edge surface of the workpiece and parallel to the sockets therein. The angular orientation of the dowel driving assemblies is accomplished in a manner such that the assemblies do not interfere with the ejection of a doweled workpiece.

On each dowel driving assembly, there is mounted a glue injection nozzle at a level aligned with the sockets in a workpiece above the bottom workpeice. Means are provided to automatically inject glue into such socket simultaneously with the driving of a dowel into a socket in the bottom workpiece. Consequently, when the succeeding workpieces fall into the doweling position, the sockets already have the necessary quantity of glue therein.

The dowel driving assemblies include a chuck which guides and grips a dowel to facilitate its entry into a socket. Also, the chuck includes a magazine chamber for holding a plurality of dowels in side-by-side relation for quick feeding into alignment with a dowel striker.

Dowels are automatically fed to the dowel driving assemblies through a coil spring attached to a vibrator containing a supply of the dowels. By having the coils of the spring axially spaced, dirt and other debris in the dowels is removed as the dowels are being fed toward the dowel driving assemblies. Also, the resiliency of the spring and its connection to the vibrator causes the spring to continually vibrate so that the dowels are kept moving in the proper direction.

The dowel driving assemblies, the traversing means and the ejector mechanism are each preferably powered by a pneumatic piston and cylinder arranged such that the piston is extended by actuation of a solenoid which allows air pressure to be applied, and automatically returned or retracted upon reaching the end of its stroke. Consequently, the completing movement of these strokes is employed to actuate the next operating element in the cycle.

In a modified form of the invention, a multiple dowel driving assembly is provided which is automatically moved into and away from the angled ends of workpieces before and after a dowel driving operation.

The combined result of the various features of the invention is a highly versatile but simply operating doweling machine which provides high speed reliable operation.

DETAILED DESCRIPTION OF THE INVENTION

For a more thorough understanding of the invention, reference may be had to the following detailed description and drawings, wherein.

Figure 1:
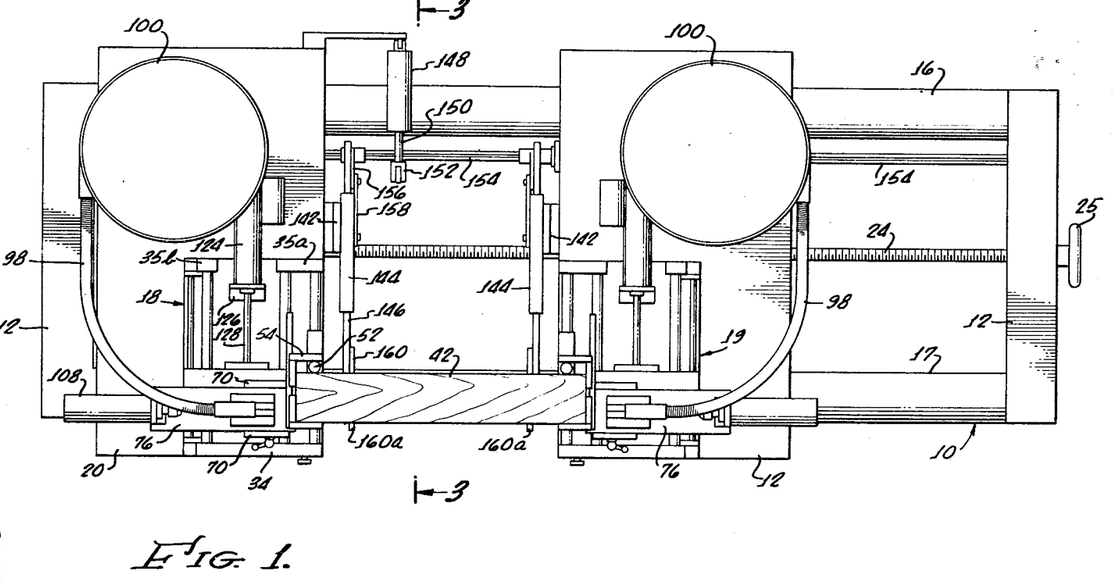
FIG. 1 is a top plan view of the dowel installing machine of the invention.
Figure 2:
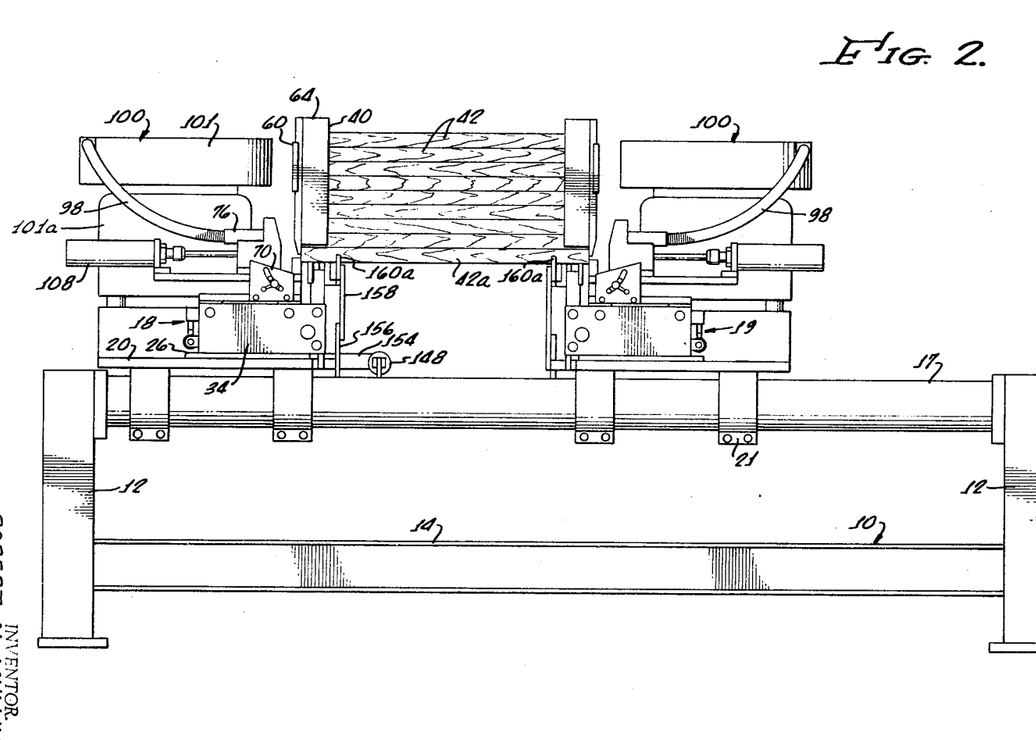
FIG. 2 is a front elevational view of the machine.
Figure 3:
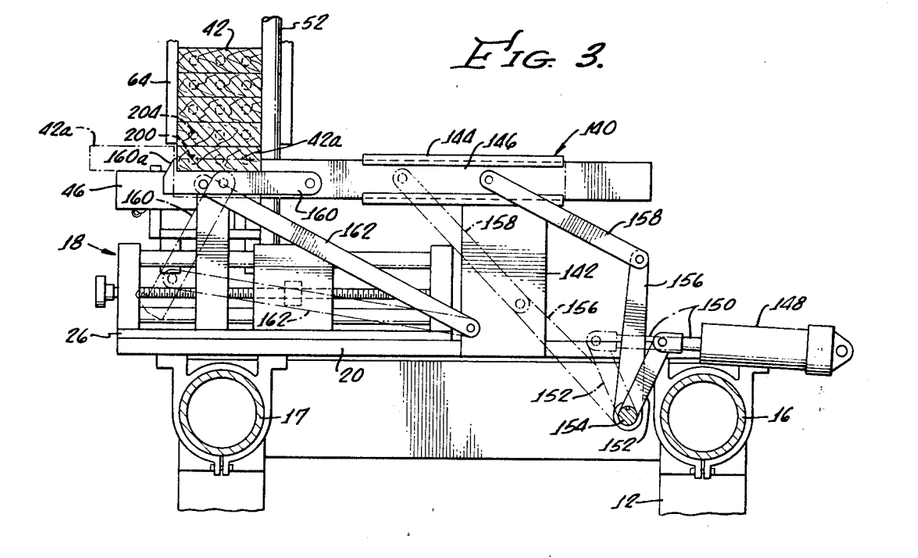
FIG. 3 is a cross-sectional view of the machine on line 3—3 of FIG. 1 illustrating the operation of the workpiece ejector assembly.

Referring first to FIGS. 1–3, the dowel installing machine may be seen to include a large supporting framework 10 having a pair of spaced vertical end supports 12 joined by a large I beam 14 near the lower portion of the supports 12 and by a pair of spaced supporting pipes 16 and 17. The machine has a capability of installing dowels at opposite ends of a workpiece and, hence, employs a left installing head 18 and a right head 19 which are identical in most respects, and hence only one of the heads will be described in detail except where it is necessary to refer to both. Each head is mounted on a large supporting carriage 20 having a pair of depending mounting blocks 21 positioned on the rear and front supporting pipes 16 and 17. In the arrangement illustrated, the mounting blocks of the left head 18 are securely fixed to the pipes 16 and 17, whereas the right head 19 is slideably mounted on the pipes so that the distance between the heads may be varied to accommodate workpieces of different lengths. A drive shaft 24 and a control wheel 25 are attached to the carriage 20 for moving the right head 19.

Each head includes a base plate 26 mounted for pivotal movement on the carriage 20 by means of a pivot pin 28 (FIG. 5) located near the front inner corner of the base plate 26. An adjusting pin 30 carried by the base plate 26 extends into an arcuate slot 32 formed in the carriage 20 with the center of the arc being the pivot pin 28. When the adjusting pin is loose, the head 18 may be pivoted and when the pin is tightenend, the head is clamped in the desired position.

Figure 4:
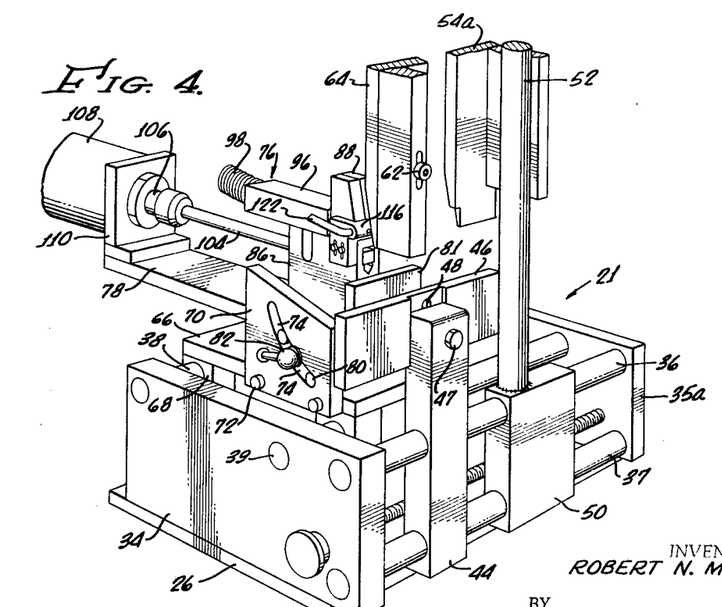
FIG. 4 is an enlarged perspective view of the left dowel installing head shown in FIGS. 1–3.
Figure 6:
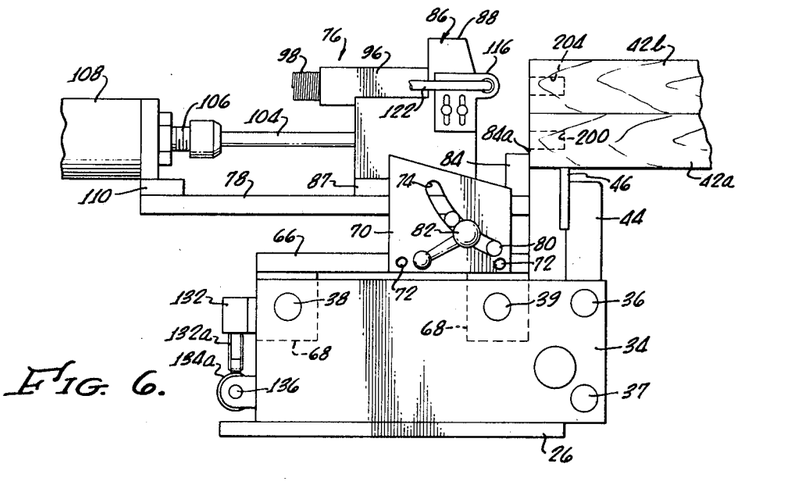
FIG. 6 is an enlarged elevational view of the left end of the machine shown in FIG. 2.
Figure 8:
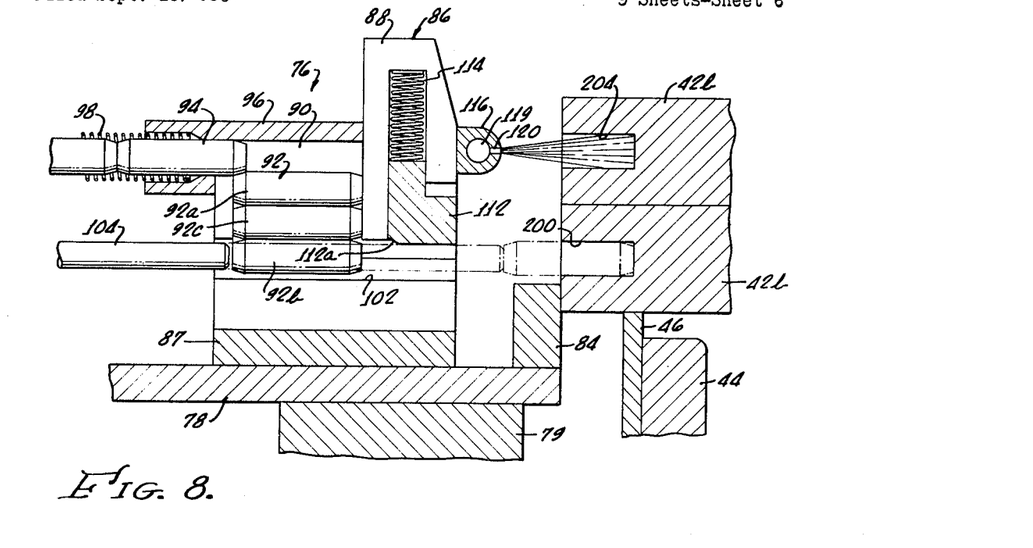
FIG. 8 is an enlarged cross-sectional view of the dowel magazine and the glue dispensing means.

Turning now to FIG. 4 as well as to FIGS. 1 and 2, the head 18 may be seen to include a front vertical plate 34 and rear vertical plates 35a and 35b securely attached to the base plate 26. The plates 34 and 35a are further connected by upper and lower shafts 36 and 37, and by a horizontally oriented shaft 39 which is spaced from a shaft 38 joining the plates 34 and 35a. The shafts 36 and 37 provide support for components forming a hopper generally indicated by the numeral 40 for supporting a plurality of substantially identical elongated boards or workpieces 42 which are arranged in a vertical stack. The boards are provided with one or a series of outwardly extending sockets in the ends for receiving dowels, and the sockets in adjacent boards are vertically aligned in parallel relation, as seen in FIGS. 3, 6 and 8.

The hopper 40 includes a vertical strut 44 which is slideably mounted on the shaft 36 and 37. A horizontally oriented member 46 is adjustably attached to the upper end of the strut 44 by means of a suitable fastener 47 extending through a vertically oriented slot 48. The upper edge of the support member 46 forms a supporting surface for one end of the stack of boards 42. A similar arrangement included in the right head 19, FIG. 1, supports the other end of the vertical stack of boards 42. With this simple two support arrangement, curved as well as straight boards can be handled.

A block 50 is slideably mounted on the shafts 36 and 37 and spaced rearwardly from the vertical strut 44. A vertical guide shaft 52 attached to the block 50 extends upwardly therefrom to define the rear guiding surface for the workpieces 42. A vertically oriented corner member 54 is welded or otherwise suitably attached to the guide shaft 52. As can be seen from FIGS. 4 and 1, the end wall 54a of the corner member 54 forms an end guiding surface for the workpieces above the bottom workpiece 42a.

Figure 10:
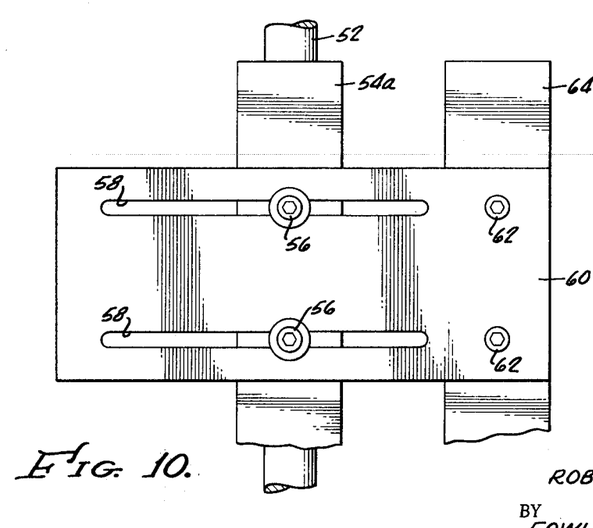
FIG. 10 is a side elevational view of a portion of one end of the hopper showing its adjustability.

As can be seen from FIG. 10, a pair of vertically spaced adjustable fasteners 56 extend outwardly from the outer side of the wall 54a and extend through horizontally oriented slots 58 formed in the horizontally oriented bracket 60. Attached to the leading end of the bracket 60 by a pair of spaced fasteners 62 is a front corner member 64, which, as can be seen from FIG. 1, positions the front corners of one end of the boards. By means of the slidable strut 44 and the block 50 and the fasteners 56 and slots 58, the front to rear dimension of the hopper may be easily adjusted to accommodate workpieces of varying widths. Since a similar arrangement is provided by the right head 22, it can be seen that a hopper 40 is formed for confining the vertical stack of boards 42. Note from FIG. 2 that the corner members 64 do not restrain the lower board 42a from moving forwardly.

Still referring to FIG. 4, a horizontally oriented head plate 66 is attached to a plurality of blocks 68 slidably mounted on the shafts 38 and 39. The entire plate 66 and the components carried thereon are slideably moved from front to rear within the confines of the vertical support plates 34 and 35a and b. A pair of vertical angle plates 70 are attached to the horizontal head plate 66 by suitable fasteners 72. Only one of the angle plates 70 may be seen in FIG. 4; however, both plates are visible in FIGS. 1, 5 and 9. A curved slot 74 is formed in each of the plates.

Carried by the vertical angle plates 70 is a chuck or dowel driving assembly 76 which includes an elongated chuck plate 78 mounted at its lower, inner end to a block 79 (see FIGS. 7–9) which carries a pair of outwardly extending support pins 80 that ride within the curved slot 74 in the angle plates 70. The chuck plate 78 may be clamped in its desired orientation by means of a manually movable clamping pin 82 which extends through the slot 74 between the pins 80 and threads into the block 79 attached to the chuck plate 78.

On the inner end of the plate 78 there is mounted a vertically extending end bumper plate 84 which is located outwardly from the horizontal hopper support 46. Since the bumper plate 84 extends slightly above the horizontal support plate 46, it limits the endwise movement of the bottom board 42a in the stack 42, as can be seen in FIGS. 6 and 8. The upper, inner edge 84a of the bumper plate 84 defines a horizontally extending line which is the axis of the curved slots 74, as may be seen in FIGS. 6 and 7. Consequently, the relation between the boards and the bumper plate 84 and the hopper 40 remains unchanged when the assembly 76 is pivoted about the axis 84a.

Still referring to FIG. 4 and also to FIGS. 6–9, the dowel driving assembly 76 further includes a chuck 86 formed by a pair of mating, upwardly extending, chuck housing members 88 held together by a clamp plate 87 attached to the plate 78. As best seen in FIG. 8, the chuck 86 includes a dowel magazine chamber 90 shown with three dowels 92 positioned therein in side-by-side vertically stacked relation. As can be seen, the length of the chamber is just sufficient to accommodate the length of the dowels 92 and the chamber height is adequate to accommodate three dowels but not quite high enough to receive a fourth dowel 94 shown positioned in a tube 96, which is attached to the chuck members 88 and forms the upper wall of the magazine chamber 90. As can be seen, the inner beveled end of the dowel 94 engages the beveled end of the upper dowel 92a in the magazine chamber 90. This interference prevents the dowel 94 from entering the chamber until the dowels 92 have been fed downwardly by gravity, but yet the following dowels do not cause the dowel 94 to restrict the downward movement of the upper dowel 92a. Instead, the arrangement tends to urge the dowel 92a downwardly.

Dowels are fed into the magazine chamber 90 by means of a tubular coil spring 98 having one end fit within the inlet to the tube 96, and having its other end extending to the rear of the machine where it joins with a dowel feeder 100 mounted on the horizontal carriage 20. The dowel feeder 100 includes a container 101 for dowels and a vibrator 101a for vibrating the container in a manner to cause the dowels to feed downwardly through the coil spring 98. Since the idea of utilizing a vibrating container for feeding small parts is not broadly new, the details of such structure will not be given. The individual coils of the coil spring 98 are spaced from each other so that much of the dirt and debris that might be in with the dowels will fall through the spaces before reaching the magazine chamber 90, thus minimizing the likelihood of a malfunction. Also, the vibration of the feeder 100 causes the spring to vibrate which facilitates the feeding of the dowels into the magazine chamber.

In the central portion of the chuck 86 there is an axially extending passage 102 in which is positioned the lower dowel 92b. To facilitate proper positioning of the dowels, the lower portion of the passage 102 is V-shaped, as seen in FIG. 4. The forward portion of the passage 102 defines an outlet from the magazine, and the rear of the passage 102 forms an inlet for a dowel driver or striker 104 which is attached to a piston 106 of a pneumatically operated cylinder 108 mounted on a bracket 110 on the outer end of the chuck plate 78.

Still referring to FIGS. 4 and 8, the upper portion of the forward end of the passage 102 in the magazine is formed by a chuck jaw 112 which is in the form of a small L-shaped block mounted for vertical reciprocation within the chuck 86. A coil spring 114 positioned within the chuck housing members 88 urges the chuck jaw 112 downwardly to grip a dowel. The combination of the V-shaped passage and the spring loaded jaw 112 enable the chuck to accurately handle dowels of different diameters. The downward movement of the chuck jaw 112 is limited by interference with the sidewalls of the passage 102 which may include inner flanges. Note that the rear lower corner 112a of the chuck jaw 112 is beveled or rounded so as not to interfere with the forward movement of the dowels.

Referring to FIGS. 4, 6 and 8, a glue dispenser 116 is mounted on the forward end of the chuck 86 and is vertically adjustable. The dispenser 116 includes an internal passage 119 and means defining an outlet nozzle 120. A conduit 122 connects the passage 119 in the dispenser 116 with a glue pump 123, shown schematically in FIGS. 5 and 13.

Figure 5:
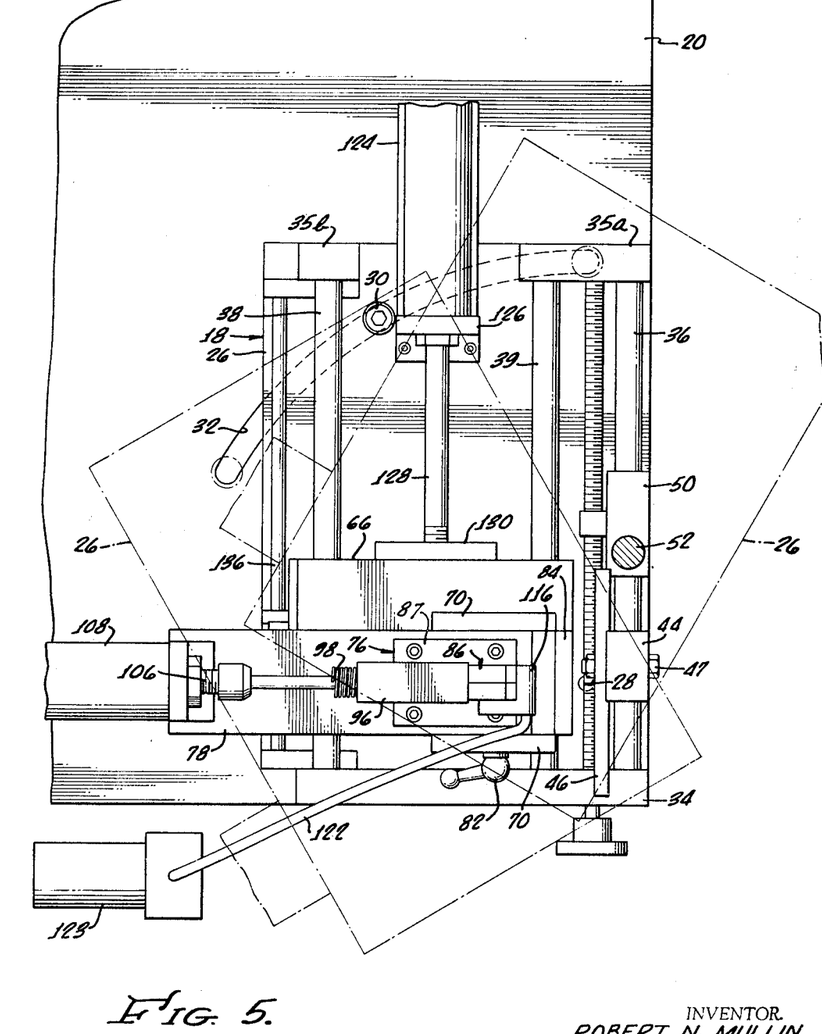
FIG. 5 is an enlarged plan view of the left side of the machine as shown in FIG. 1, and schematically illustrating the horizontal angular adjustment of the dowel driving assemblies about a vertical axis.
Figure 9:
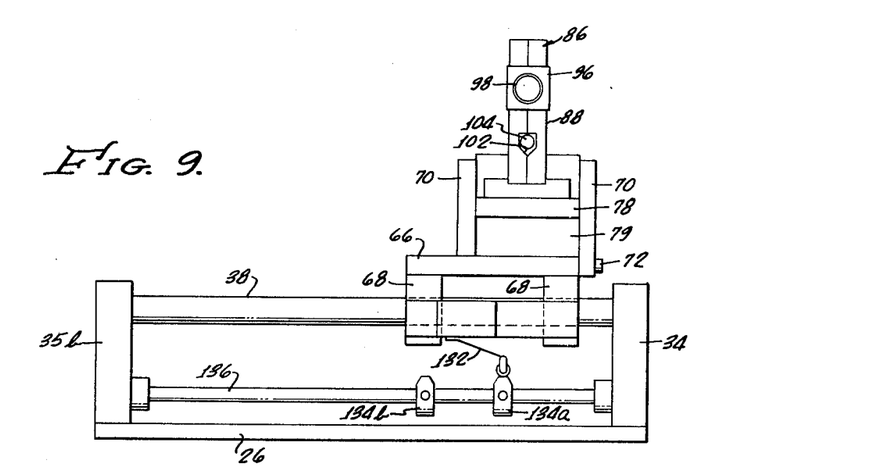
FIG. 9 is an outer side elevational view of the dowel installing head of FIG. 4 showing the stop cam indexing arrangement.

Referring now to FIGS. 1, 5 and 9, it was previously mentioned that the entire dowel driving assembly 76 is supported by the horizontal head plate 66 which, in turn, is slideably mounted on the shafts 38 and 39. For moving the dowel driving assembly in this fashion, there is provided a pneumatically operated cylinder 124 mounted on a bracket 126 attached to the base plate 26. An output piston 128 is attached at its forward end to a force distributing member 130 which is connected to the rear of the head plate 66.

In FIG. 9, a switch 132 attached to the underside of the head plate 66 controls the positioning of the piston 128 by cooperating with stop cams 134a and 134b mounted on a rod 136 extending between plates 34 and 35b.

As seen in FIGS. 1–3, there is provided an ejector mechanism 140 for ejecting the bottom board 42a from the hopper 40 at the completion of a dowel driving cycle. The mechanism 140 includes a vertically oriented supporting strut 142 for each of the heads 18 and 19 positioned to the rear of the hopper 40 and attached to the horizontal carriage 20. Carried on the upper end of each strut 142 is an elongated horizontal member 144 defining a track in which slides an ejector arm 146. The tracks and the ejector arms are positioned at a height at which the forward ends of the ejector arms 146 are aligned with the bottom board 42a in the hopper 40.

For moving the ejector arms 146 there is provided a pneumatically operated ejector cylinder 148 suitably mounted on the rear support tube 16 with its output piston 150 connected by a keyed crank arm 152 mounted on a mating slotted shaft 154 suitably supported for oscillation beneath the left and right heads 18 and 19. Reciprocation of the piston 150 causes the shaft 154 to oscillate and this oscillation is transmited to each of the ejector arms 146 by a keyed crank arm 156 on each side and a pivotally connected link 158 having its upper end pivotally attached to the ejector arm 146.

Still referring to FIG. 3, an elongated dog 160 is pivotally connected to the forward end of the ejector arm 146 and extends forwardly beneath the hopper 40 and the stack of boards 42. The forward end of the dog 160 is formed with an upwardly extending hook 160a which engages the forward surface of the bottom board 42a to hold the board rearwardly against the guide shaft 52. The hook includes a spring biased element (not shown) for engaging the boards, to accommodate varying tolerances. A control arm 162 is pivotally connected near the forward end of the dog 160 and the opposite end of the control arm 162 is pivotally connected to the strut 142 or some other suitable fixed support. As can be seen from the broken line showings in FIG. 3, forward movement of the ejector arm 146 also moves the dog 160; and, due to the existence of the control arm 162, the hook 160a of the dog is moved downwardly as the ejector arm 162 moves forwardly.

Figure 13:
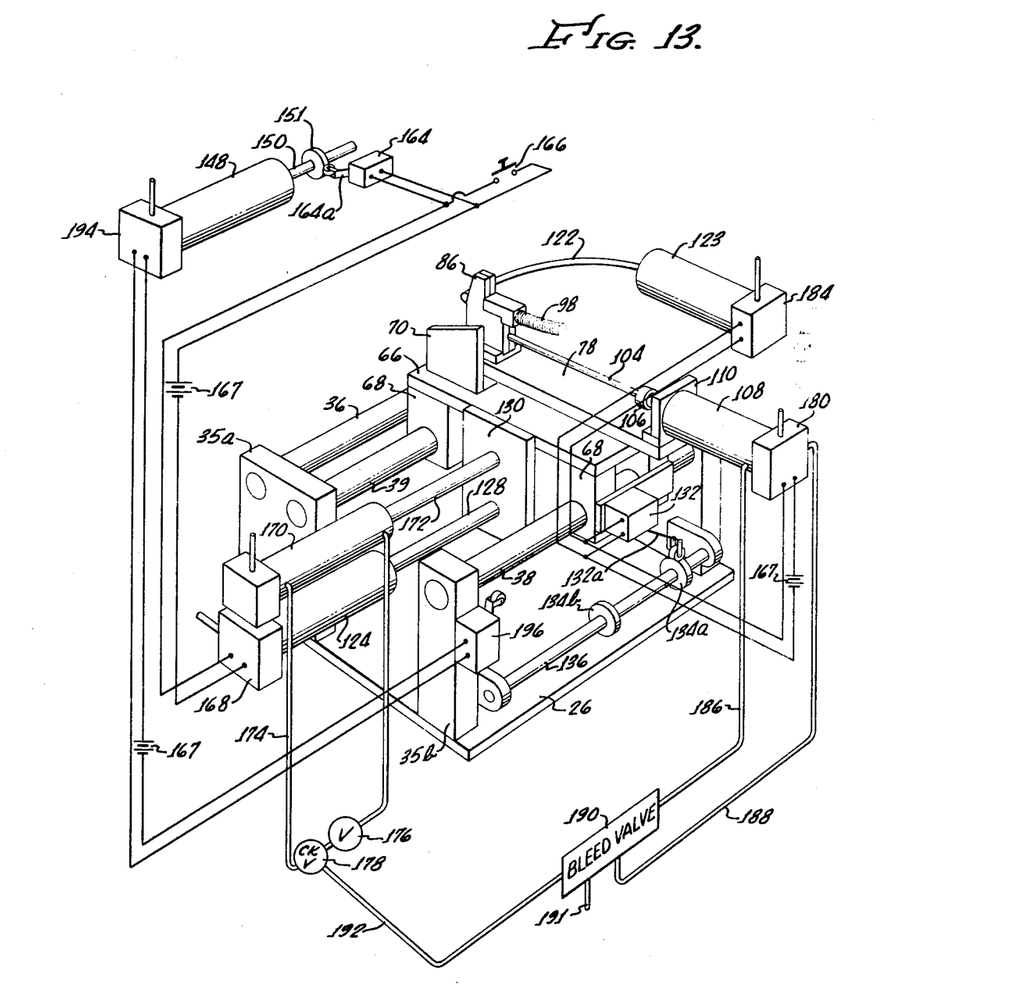
FIG. 13 is a schematic illustration of the control system for the dowel installating machine.

Refer now to FIG. 13 for a description of the fluid and electrical control system for the dowel installing machine of the invention. It should be understood that the illustration of FIG. 13 is diagrammatic and that in many instances the physical location of the components involved can be varied considerably to fit the particular application. The pneumatically operated cylinders 108, 124 and 148 are connected to a suitable source of air pressure (not shown) and each has a bleed outlet (not shown). They are each of the type which includes an internal airflow control element (not shown) which normally holds the piston in its retracted position. However, when moved to an opposite position, the element will cause the piston to be driven to a fully extended position where a bleed is opened to automatically retract the piston. Each of the cylinders also includes an electrically operated solenoid for positioning the airflow control element in a manner such that when the solenoid is momentarily energized, the piston will extend and then automatically retract. Since such structure is conventional and readily commercially available, a detailed illustration and description will not be given.

In general, the completion of one operation closes a switch which energizes the solenoid associated with the cylinder to perform the succeeding operation. Thus, the ejector piston 150 has mounted thereon an element 151 which contacts a switch arm 164a of a normally open switch 164 mounted in the path of the controlling element 151. The nature of the switch arm 164a mounting is such that the switch is only closed when the controller 151 is being retracted. The switch 164 is electrically connected in parallel with a momentary switch 166 for initiating operation of the machine and is serially connected with a suitable power source 167 and a solenoid 168 associated with the pneumatically operated cylinder 124 which moves the head plate 66 carrying the dowel driving assembly 76. For controlling the position of the dowel driving assembly 76, there is provided a commercially available hydraulically operated position controller 170 connected by a piston 172 to the force distributing member 130. The chambers formed in opposite ends of the position controller 170 are connected by a by-pass 174 having a speed control valve 176 which controls the rate of movement of the piston 172. A pneumatically operated check valve 178 is also positioned within the by-pass 174 to interrupt the flow of hydraulic fluid through the by-pass 174 to stop the movement of the piston 172 and thereby stop movement of the piston 128 and the head plate 66 carrying the dowel driving assembly 76.

The switch 132 carried by the head plate 66 and operated by the cam stops 134 is electrically connected to a solenoid 180 associated with the cylinder 108. The switch 132 is further connected to the power source 167 and to a solenoid 184 associated with the glue dispensing pump 123, which includes a spring biased plunger that provides a single pulse or stroke when the solenoid 184 is energized.

An air line or conduit 186 connects a high pressure chamber within one end of the cylinder 108 to a bleed valve 190 which is normally open to an air line 192 connected to the check valve 178. An air line 188 connecting the bleed valve 190 and the cylinder 108 provides a pilot signal to control the operation of the bleed valve 190. The construction of the cylinder 108 and the bleed valve 190 is such that the line 192 is opened to an exhaust orifice 191 upon a reduction of pressure in th lines 188.

Energization of a solenoid 194 associated with the cylinder 148 is controlled by a series connection to the power source 167 and to a normally open switch 196 mounted on the support plate 35b. The switch 196 is closed by the support plate 66 when the plate, carrying the dowel driving assembly 76, is in its rearward most position.

OPERATION

Consider now the operation of a complete cycle of the machine. Assume that the hopper 40 is filled with a stack of boards 42 as illustrated in FIG. 2, with each of the boards having one or more sockets that are vertically aligned with the sockets in the other boards. Assume further that the electrical system is unenergized so that the cylinders 108, 148, and 124 have their pistons fully retracted. To commence operation, the momentary switch 166 is manually closed, thus completing a circuit to energize the solenoid 168 so that air pressure drives the piston 128 forwardly and, in turn, slides the head plate 66 on the shafts 38 and 39. The dowel driving assembly 76 is thus traversed forwardly along the edge of the bottom board 42a to its forwardmost position and starts to return automatically.

The cam stop 134a which is adjustable along the rod 136, has been previously indexed with the first or forward socket formed in the edge of the bottom board 42a. Consequently, when the dowel driving assembly 76 is aligned with that socket, the arm 132a of the switch 132 engages the cam stop 134a and is thereby closed. It should be mentioned that the mounting of the switch 132 is such that it is not closed when its arm 132a engages the cam stops 134 during the forward travel of the dowel driving assembly 76. Closing the switch 132 energizes the solenoid 180 associated with the cylinder 108. This operates the internal bleed within cylinder 108 and permits air pressure to be applied to one end of the cylinder 108 to drive the piston 106 forwardly, along with the striker 104, to thus start a dowel driving operation.

As air pressure is applied to the cylinder 108, pressure is also applied through the line 186, the bleed valve 190 and the line 192 to the check valve 178. Closing the check valve 178 stops movement of the piston 172 and, hence, the rearward movement of the piston 128 and the dowel driving assembly 76. It should be noted that the pneumatically operated check valve 178 can alternatively be connected to a source of air pressure controlled by a solenoid directly electrically energized upon the closing of the switch 132 if desired.

Referring to FIG. 8, as well as FIG. 13, the forward movement of the striker 104 drives the dowel 92b forwardly through the passage 102 and the chuck jaw 112 and drives the dowel into a socket 200 formed in the edge of the bottom board 42a, as is shown by the broken lines in FIG. 8. Note that the dowel is longer than the distance between the chuck 112 and the board 42b; and, hence, the dowel is gripped by the chuck until it enters the socket 200.

As was stated, the cylinder 108 is constructed such that when the striker 104 reaches its forwardmost position, it will be automatically retracted. As the striker 104 is withdrawn from the passage 102, the next dowel 92c will quickly fall sideways into position to be driven by the striker in the succeeding operation. Also, the dowel 94 is then free to move into the magazine chamber 90.

Closing of the switch 132 also energizes the solenoid 184 associated with the glue dispensing pump 123. This causes a jet of glue 202 to be forced out of the nozzle 120 which enters the socket 204 in the board 42b located immediately above the bottom board 42a. Thus, the socket 204 is ready to receive a dowel when the board 42b reaches the bottommost position. Since the glue is quickly dispensed while the dowel 92c is being driven, the speed of operation is limited only by the dowel driving step.

The striker 104 and the piston 106 are automatically retracted because the air pressure applied to the piston 106 in the end of the cylinder 108 connected to the line 186 is opened to exhaust when the piston 106 reaches its forwardmost position, and pressure is simultaneously applied to the other end of the cylinder 108. At the same time the line 188 is opened to exhaust, which controls the bleed valve 190 so that pressure is exhausted from the line 192 through the bleed valve orifice 191. This permits the check valve 178 to open so that hydraulic fluid flows once more through passage 174, allowing continued retraction of the piston 128.

If the bottom board 42a is provided with more than one socket along its end, it will be indexed with respect to a second stop cam 134b so that as the switch 132 reaches the second stop cam 134b, the rearward travel of the dowel driving assembly 76 will be once more interrupted and a dowel will be automatically driven into the socket in the manner described. The dowel driving operations for adjacent sockets in a single board occur in rapid succession, and hence it is important that the magazine chamber 90 contain enough dowels for a single board since it takes more time for a dowel to move endwise into the chamber than sideways one space. Most situations require no more than three dowels in one end of a board;

however, a chamber of greater capacity can be provided if desired.

After all of the sockets in the bottommost board 42a have received a dowel, the piston 128 carrying the dowel driving assembly rearwardly reaches its fully retracted position and closes the limit switch 196 which energizes the solenoid 194 associated with the pneumatically controlled ejector cylinder 148. Energization of the solenoid 194 allows air pressure to drive the piston 150 forwardly. Referring to FIG. 3, this action rotates the shaft 154 in a counterclockwise direction through the bell crank 152 and causes the bell crank 156 to pivot, moving the connecting link 158 to drive the ejector arms 146 forwardly. Simultaneous with the forward movement of the ejector arms 146, the dog 160 pivots downwardly by virtue of the control arm 162 so that the hook 160a no longer restricts forward movement of the bottommost board 42a. The forwardmost position of the ejector mechanism is shown in broken lines wherein the board 42a has been pushed forwardly by the ejector arms 146 out of the hopper. The remaining boards 42 in the hopper then fall by gravity downwardly so that the succeeding board 42b is in the doweling position.

As the ejector arms 146 reach their forwardmost position, the operation of the ejector cylinder 148 causes the arms to be once more retracted and the dogs 160 swing into position urging the then bottommost board 54 against the guide shaft 52. As the ejector piston 150 reaches its rearwardmost position, its positioning element 151 once more closes the limit switch 164 to initiate a second cycle of the doweling machine.

Figure 11:
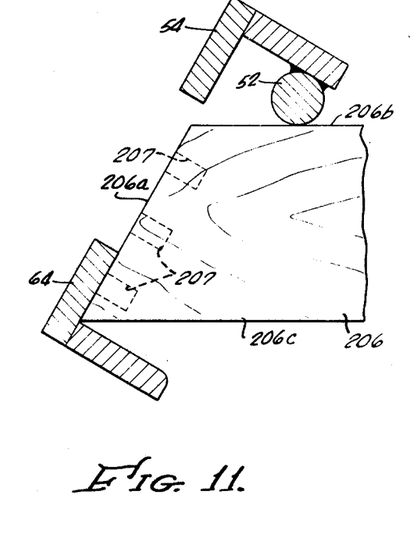
FIG. 11 is a cross-sectional plan view of one end of the hopper oriented to cooperate with a workpiece having an obliquely angled end edge.

One of the important features of the invention is that the dowel driving assembly 76 can be angularly oriented about both a horizontal and vertical axis. This permits the machine to handle boards which have ends with a simple angle about one axis, or with a compound angle about both axes. As shown by the broken lines in FIG. 5, the horizontal base plate 26 may be swung in either direction about the pin 28. With the movable head 18 swung to its extreme clockwise position in FIG. 5, the relationship of the hopper 40 to the boards appears as shown in FIG. 11. As can be seen, the end 206a of a board 206 is parallel to the ends of the corner members 54 and 64, but angled with respect to the front and rear edges 206b and 206c. The sockets 207 are perpendicular to the end 206a and obliquely angled with respect to the rear and front edges 206b and 206c. It should also be noted that the board rear edge 206b engages the surface of the guide shaft 52. The shaft 52 has been given a circular cross-section so that it does not mar the boards or interfere with the proper positioning of the boards when the corner members 54 and 64 of the head 18 are oriented as indicated in FIG. 11. It can be appreciated that if the shaft 52 had a rectangular cross-section, the position of the board 206 would be changed from that indicated. The location of the dowel sockets in the board are normally measured from the edge of the board and it is this edge which is usually placed against the guide shaft 52.

Figure 12:
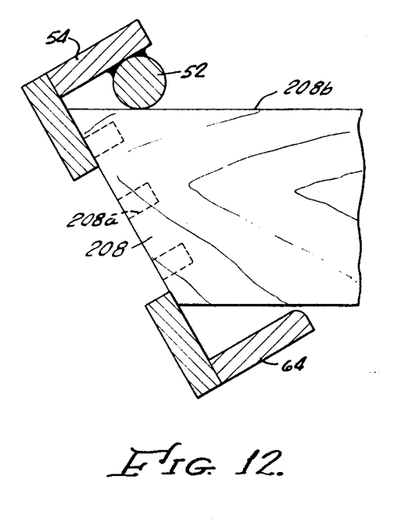
FIG. 12 is a view similar to FIG. 11 with the hopper and the board angled in the reverse direction.

The reverse arrangement of FIG. 11 is illustrated in FIG. 12, wherein the head has been pivoted in the other direction in that the longer, rear edge 208b of the board 208 is its reference surface for the location of its sockets 208a. Note that the bottommost board in the hopper 40 is below, and hence not restrained by the front corner member 64.

Figure 7:
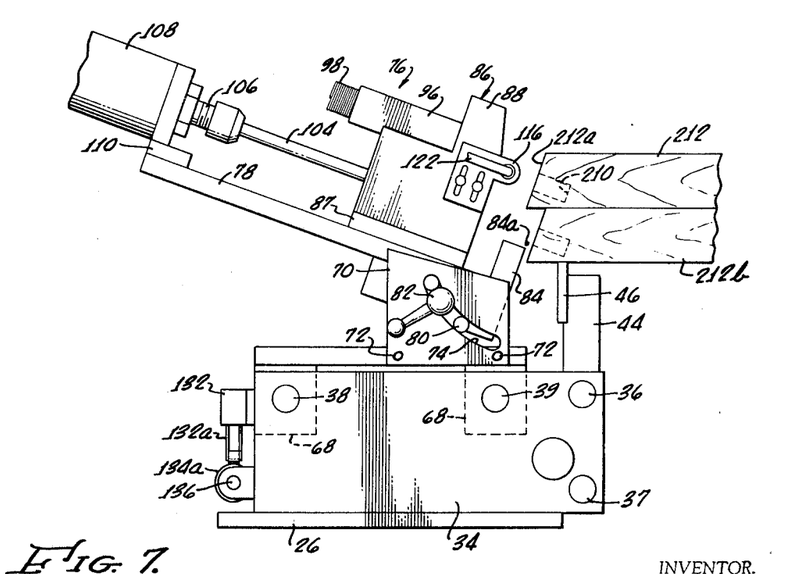
FIG. 7 is a view similar to FIG. 6 with the dowel driving assembly shown pivoted around a horizontal axis.

In FIG. 7, assembly 76 is shown pivoted so that dowels will be driven parallel to the angled sockets 210 in the boards 212. The sockets 210 are perpendicular to the ends 212a, which are obliquely angled with respect to the upper and lower surfaces 212b of the boards 212. When the end of the board has a compound angle in both planes, the dowel driving assembly can be adjusted for both angles accordingly as in FIGS. 7 and 11.

Figure 14:
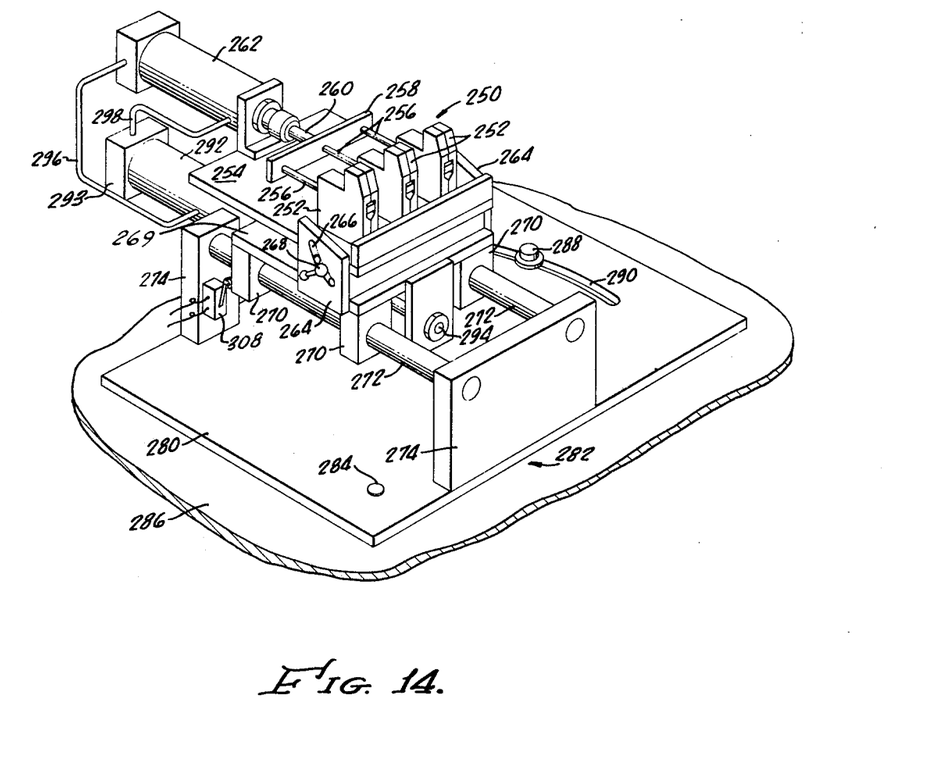
FIG. 14 is a perspective illustration of a multiple dowel driving assembly.

Referring now to FIG. 14, a second embodiment of the invention employs a multiple dowel driving assembly 250.

As can be seen, three chucks 252 are schematically illustrated mounted side-by-side on a chuck support plate 254. As in the previous embodiment, the chuck plate 254 is mounted for pivotal movement about a horizontal axis by means of the vertically oriented angle plates 264 having a curved slot 266 with adjustable means 268 for mounting the multiple dowel driving assembly 250 in the desired orientation.

The vertical support plates 264 are in turn mounted on a head plate 269 carrying depending blocks 270 which are slideably mounted on a pair of shafts 272 extending between a pair of vertical end plates 274 mounted on a horizontal base plate 280, which with the components thereon form a movable head 282. Thus, the head 282 is pivotable about a pin 284 mounted in the plate 280 and a horizontal carriage 286. The head is fixed in its desired angular orientation by the adjustable clamp 288 which rides within the arcuate slot 290 in the base plate 280 and threads into the carriage 286.

It is intended that the number of chucks 252 provided will be the same as the number of sockets formed in the edge of a single board. With such arrangement, there is no need to traverse the multiple dowel driving assembly 250 from the front edge to the rear edge of the board as in the previously described embodiment of the invention. However, in order to accommodate some boards having angled end surfaces, it is necessary that the dowel driving assembly 250 be retracted to permit the board within the hopper to fall and be ejected.

For example, if an angled board is oriented as shown in FIG. 12, it could not be ejected since it would engage the structure associated with the multiple dowel drive assembly 250. The multiple dowel drive assembly 250 can be left stationary if the workpieces having angled ends are positioned with their longer edges towards the front and towards the bottom, as in FIG. 11, so that the movable head 282 does not interfere with the ejecting operation. Thus, the boards in FIG. 2 could be inverted, but in some instances this is not convenient.

Hence, a pneumatically operated cylinder 292 is mounted on the base plate 280 with its piston 294 extending inwardly to engage the slideably mounted head plate 269 carrying the multiple dowel driving assembly 250. The piston 294 is normally retracted. Upon application of air pressure to one end of the cylinder, its piston extends where it will stop and provide a pilot signal to the cylinder 262 through a pilot line 296. Cylinder 262 and its piston 260 are constructed such that the piston is normally retracted. Upon receiving a pilot signal from the cylinder 292 through the line 296, the piston 262 extends and automatically retracts. A pilot signal through pilot line 298 between the cylinders 262 and 292 simultaneously causes the piston 294 to retract.

The additional necessary switches and air power connections are provided so that the drive assembly 250 may be reciprocated inwardly and outwardly in the desired sequence with the dowel driving and board ejecting operations. More specifically, assume that the piston 294 and the piston 260 are both in their fully retracted position, as is the piston of the ejector mechanism (not shown in FIG. 14 but substantially identical to that of FIG. 1). By energizing a solenoid 293 associated with the cylinder 292, the piston 294 extends to drive the head plate 269, carrying the multiple dowel drive assembly 250 inwardly until it reaches its innermost position, where it stops and transmits a pilot signal to cylinder 262. This causes the piston 260 to drive the bar 258 and the strikers 256 inwardly to insert the dowels into the workpiece. The piston 260 automatically returns to its retracted position within the cylinder 262 by opening the high pressure chamber within the cylinder to exhaust. Simultaneously a pilot signal to the cylinder 292 causes the piston 294 to retract, thereby withdrawing the multiple dowel drive assembly 250 from the workpiece. When fully withdrawn, a normally open switch 308 mounted on the support plate 274 is closed, thus energizing the ejecting mechanism which operates identical to the mechanism previously described. The return movement of the ejector piston closes a normally open switch which once more energizes the solenoid 293 to repeat the cycle.

It should be appreciated that the combined movements of the head assembly of the primary embodiment of the invention and of the FIG. 14 embodiment can be combined if desired. That is, a multiple dowel driving assembly for movement away from the end of the board, as in FIG. 14, may also be indexed for transverse movement along the edge of the workpiece. Such an arrangement may be desirable in a board having a large number of sockets in one edge.

What is claimed is:

1. A machine for installing dowels comprising:
a hopper including a lower supporting surface and adjacent vertically extending side walls;
a pair of dowel driving assemblies mounted adjacent opposite ends of the hopper for driving dowels transversely toward the hopper near its bottom;
an ejector assembly located near the hopper lower end for extending and retracting an ejector arm into and out of the lower end of the hopper upon completion of a dowel driving operation;
means for adjusting the vertical angular orientation of the driving assemblies; and
means for adjusting the horizontal angular orientation of the driving assemblies.

2. A machine for installing dowels, comprising:
a hopper for supporting a stack of workpieces each having an outwardly opening socket in an edge surface, the sockets being substantially vertically aligned;
a dowel driving assembly adjacent the hopper for driving a dowel into the socket of the workpiece at the bottom of the stack; and
an ejector assembly for automatically ejecting the bottom workpiece from the hopper upon completion of the dowel driving operation, thus allowing the stack to fall so that the next workpiece is in position for the next dowel driving operation.

3. The machine of claim 2, wherein the hopper includes:
spaced front and rear means for engaging the front and rear edges of the workpieces, the engaging means being adjustable to permit the accommodation of workpieces of varying front to rear dimensions;
the rear engaging means forming reference surfaces for accurately positioning the workpieces; and,
means urging the bottom workpiece against the rear reference surfaces.

4. The machine of claim 2, wherein the ejector assembly includes:
a pair of spaced ejector arms slideably mounted to the rear of the hopper; and
an ejector cylinder and piston connected by suitable linkage to the ejector arms for forcing the ejector arms forwardly to engage the bottom workpiece and thrust it forwardly from beneath the stack.

5. The machine of claim 4, wherein the ejector cylinder and piston are adapted when energized to drive the ejector arms forwardly and automatically return the ejector arms to a retracted position, and including a switch operated by the return movement of the ejector piston to initiate operation of the next dowel driving operation.

6. A machine for installing dowels in a series of sockets formed in the end edges of a workpiece and extending in generally the same planes, comprising:
means for supporting a workpiece;
a dowel driving assembly adjacent the supporting means for automatically driving dowels into the edge sockets;
means for moving the driving assembly in a plane along the end edge of the workpiece;
means for sequentially momentarily stopping the assembly as the assembly is aligned with each of the sockets in the series; and
means for automatically causing the drive assembly to drive a dowel into each socket when the assembly is aligned with a socket.

7. The machine of claim 6, including:
a control switch carried with the dowel driving assembly for controlling the energization of the stopping means and the dowel driving assembly; and
a series of stop cams indexed to the position of each of the sockets and positioned in the travel path of the switch, the switch being designed to be operated by the stop cams.

8. The machine of claim 6, wherein:
the means for moving the dowel driving assembly along the edge of a workpiece includes a piston connected to the assembly;
the means for stopping the piston and hence the dowel driving assembly includes a position controller attached to the dowel driving assembly and operated by a check valve;
and including a switch for causing the position controller to stop the dowel driving assembly when the dowel driving assembly is aligned with each of the sockets, said switch being further connected to initiate operation of the driving assembly to drive a dowel into one of the sockets at each of the momentary stops; and
means controlled by the completion of a dowel driving operation for releasing the position controller, thereby permitting the dowel assembly to continue its travel along the edge of the workpiece, thus causing the switch to be operated to cease operation of the dowel driving assembly until the next socket position is reached.

9. A dowel driving assembly comprising:
means defining a magazine chamber having space for receiving a plurality of dowels in a side-by-side vertical stack;
a reciprocating striker piston for driving a dowel out of the magazine, thus allowing the next dowel to fall automatically into position aligned with the striker piston; and
means for feeding additional dowels endwise into the upper portion of the magazine, the feed means includes a passage having an outlet located with respect to the dowel in the top of the magazine such that a beveled end edge of the dowel in the top of the magazine engages a beveled end edge of the dowel in the outlet so that the upper dowel in the magazine will be permitted to fall by gravity without interference by the following dowel.

10. A dowel driving assembly, comprising:
means defining a magazine chamber having space for receiving a plurality of dowels in a side-by-side vertical stack;
a reciprocating striker piston for driving a dowel out of the magazine, thus allowing the next dowel to fall automatically into position aligned with the striker piston;
means for feeding additional dowels endwise into the upper portion of the upper portion of the magazine, and
chuck means defining an outlet from the magazine chamber, aligned with the striker piston, with a spring biased chuck jaw engaging the side of a dowel to guide and support it as it is being driven through the outlet.

11. The machine of claim 10, wherein the chuck jaw forms one side of the passage and a V-shaped passage forms the other side.

12. A dowel installing machine, comprising:
a horizontal supporting surface for supporting an elongated workpiece having an edge with a dowel receiving socket oriented at an oblique angle with respect to the length of the workpiece;

a dowel driving assembly mounted adjacent one end of the supporting surface;

means for adjusting the orientation of the driving assembly so that a dowel to be driven is similarly obliquely oriented with its axis parallel to the socket axis;

a bumper plate adjacent one end of the horizontal supporting surface and extending above the surface to restrain one end of a workpiece, the upper edge of the bumper plate being located beneath the socket in the workpiece; and means for supporting the driving assembly for pivotal movement about a horizontal axis extending approximately through the upper inner edge of the bumper plate so that the location of the upper inner edge of the bumper plate remains substantially fixed when the driving assembly is adjusted about the horizontal axis.

13. A dowel installing machine, comprising:

a horizontal supporting surface for supporting an elongated workpiece having an edge with a dowel receiving socket oriented at an oblique angle with respect to the length of the workpiece;

a dowel driving assembly mounted adjacent one end of the supporting surface;

means for adjusting the orientation of the driving assembly so that a dowel to be driven is similarly obliquely oriented with its axis parallel to the socket axis; and means for engaging and positioning the rear and leading edges of the workpiece including a vertically oriented post for engaging the rear edge of the workpiece to serve as a reference surface for determining the position of the dowel driving assembly, the guidepost having a circular cross-section so that when the dowel driving assembly is adjusted about the vertical axis, the position of the reference surface is unchanged.

14. A dowel installing machine, comprising:

a horizontal supporting surface for supporting an elongated workpiece having an edge with a dowel receiving socket oriented at an oblique angle with respect to the length of the workpiece;

a dowel driving assembly mounted adjacent one end of the supporting surface; and means for adjusting the orientation of the driving assembly so that a dowel to be driven is similarly obliquely oriented with its axis parallel to the socket axis;

said dowel driving assembly including:

a lower supporting base plate pivotally mounted on a vertically oriented pin fixed to a carriage and including means for fixing the base plate when the desired angular orientation is selected;

a chuck plate carrying a chuck for receiving and dispensing dowels and a striker piston and cylinder for driving dowels from the chuck into sockets in the workpieces;

a pair of vertically oriented spaced support plates supported by the base plate and having a pair of curved slots which are circular segments about a predetermnied horizontal axis;

a pair of vertically and horizontally spaced pins positioned on each side of the chuck plate, and riding within the curved slots for supporting the chuck plate with respect to the base plate; and     clamp means for fixing the pins within the slots to obtain the desired angular orientation of the chuck and piston about the horizontal axis.

15. A machine for installing dowels into a socket formed in the edge of a workpiece, comprising:

means for supporting a workpiece;

a dowel driving assembly located adjacent to the supporting means for automatically driving a dowel into the socket; and means for feeding additional dowels to the dowel driving assembly as needed including a dowel storage container positioned above the driving assembly, a tubular coil spring having spaced coils connecting the storage container to the driving assembly for guiding dowels to the driving assembly; and means for vibrating the dowel storage container for causing the dowels to feed through the spring to the driving assembly.

16. A dowel installing machine, comprising:

means defining a hopper for a vertical stack of workpieces each having an end surface with one or more dowel receiving sockets drilled therein;

a dowel driving assembly mounted adjacent the end of the workpiece in the bottom of the stack and including means for driving a dowel into an edge socket of the workpiece at the bottom of the stack; and glue dispensing means mounted on the driving assembly including a dispenser nozzle vertically aligned with a dowel dispensing outlet in the dowel driving assembly and spaced upwardly at a level with the dowel sockets in a workpiece above the bottom workpiece.

17. A dowel installing machine, comprising:

means defining a hopper for confining and supporting a vertical stack of workpieces each having a pair of opposite end surfaces with one or more dowel receiving sockets drilled therein;

a dowel driving assembly mounted adjacent each end of the workpiece in the bottom of the stack and including a dowel chuck with a dowel striker piston inlet and a dowel outlet parallel to and at the same height as the dowel receiving sockets;

means for traversing the driving assemblies in a horizontal plane along the ends of the workpiece and for sequentially momentarily stopping the assemblies with the chuck outlets aligned with each socket;

the dowel driving assembly including a striker cylinder and piston aligned with the striker inlet in the chuck and including means for operating the striker piston when the dowel outlet is aligned with a dowel socket to cause the striker piston to strike the end of a dowel in the chuck and drive the dowel into the socket;

glue dispensing means mounted on each dowel driving assembly including a dispensing nozzle vertically oriented with the chuck dowel outlet and spaced upwardly at a level with the dowel sockets in the next workpiece above the bottom workpiece, and means for automatically dispensing glue into the socket aligned with the nozzle while a dowel is being driven by the striker piston into a socket in the bottom workpiece;

vibrator means for automatically feeding dowels into the dowel magazine; and means for automatically ejecting the bottom workpiece from the hopper after dowels have been installed in its end sockets.

18. The machine of claim 17:

including a frame having a pair of spaced support members with the dowel driving assemblies being independently mounted on the spaced support members, one of the driving assemblies being slideably mounted to adjust the spacing between the driving assemblies so that different size workpieces may be handled by the machine; and wherein the hopper means includes means for supporting opposite ends of a workpiece, being attached to the adjacent driving assembly so that the hopper size changes as the spacing between the driving assemblies changes.

19. A dowel driving machine, comprising:

a hopper for supporting and confining workpieces having a plurality of sockets in an edge surface; and a multiple dowel driving assembly including a plurality of dowel chucks arranged in side-by-side relation for simultaneously driving a plurality of dowels into the sockets of a workpiece, and means for moving the chucks away from the hopper at the completion of a dowel driving operation and toward the hopper before a succeeding dowel driving operation.

20. The machine of claim 19, including a bumper plate mounted on the dowel driving assembly and forming an end wall of the hopper for restraining endwise movement of a workpiece.

21. The machine of claim 19, including means for adjusting the angular orientation of the dowel driving assembly about both a vertical and a horizontal axis.

References Cited
UNITED STATES PATENTS

| | | | |
|---|---|---|---|
| 1,080,274 | 12/1913 | Frantz | 227—14 |
| 1,089,530 | 3/1914 | Brown | 227—14 |
| 1,122,569 | 12/1914 | Bell | 227—14 |
| 1,137,854 | 5/1915 | Frantz | 227—14 |
| 2,910,698 | 11/1959 | Paxton | 227—148 XR |
| 3,386,639 | 6/1968 | Unger | 227—14 |

GRANVILLE Y. CUSTER, JR., Primary Examiner

U.S. Cl. X.R.

227—26